July 2, 1935.　　　H. G. COX　　　2,006,792
MAGNETO
Original Filed Oct. 30, 1931
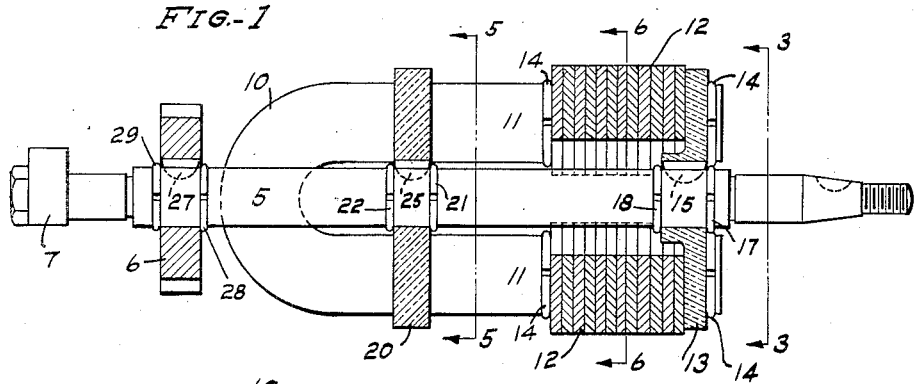
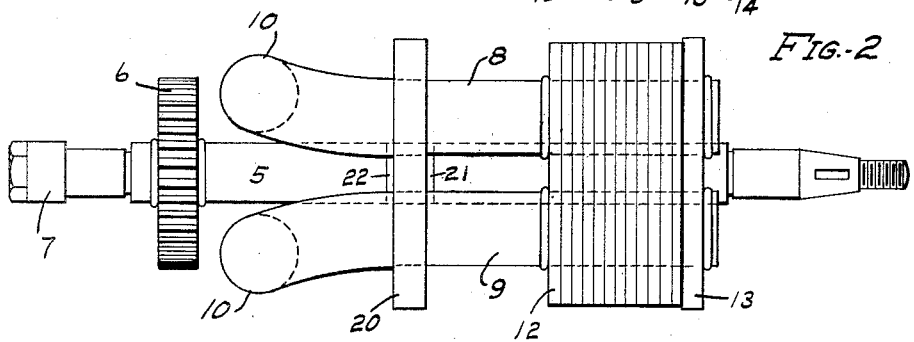
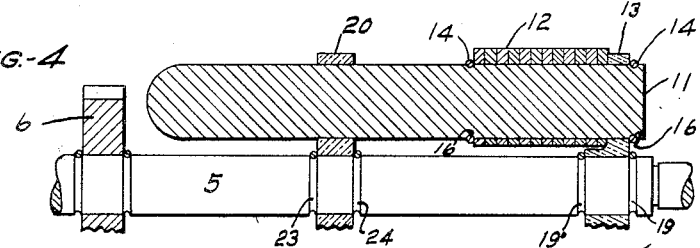
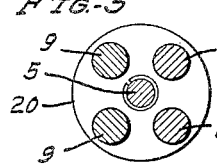
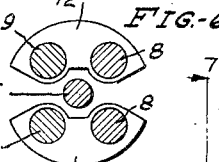
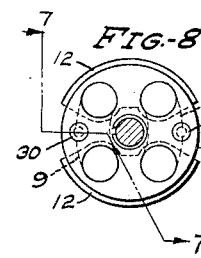
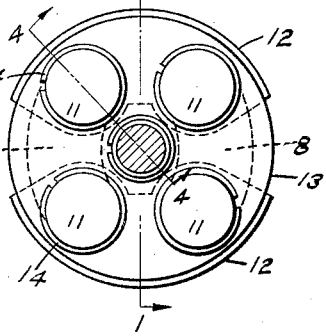
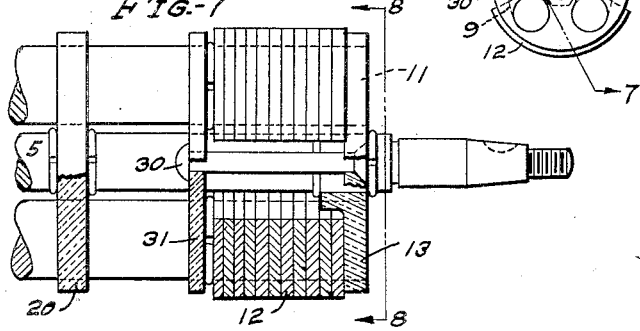
INVENTOR.
HENRY G. COX
BY James A. Walsh
ATTORNEY Patented July 2, 1935

2,006,792

UNITED STATES PATENT OFFICE 2,006,792

MAGNETO

Henry G. Cox, Beloit, Wis., assignor to J. I. Case Company, Racine, Wis., a corporation Application October 30, 1931, Serial No. 572,198
Renewed November 23, 1934

15 Claims. (Cl. 171—209)

My invention relates to magnetos, and particularly to a rotor therefor comprising as its essential elements permanent magnets suitably assembled about an actuating shaft to constitute therewith a revolving unit which may be readily installed and removed.

In the ordinary magneto rotor the built-up or composite magnet usually consists of a plurality of permanent bar magnets, which extend longitudinally of the rotor in spaced relation to each other and are supported or engaged at their ends by plates one of which is non-magnetic and the other of soft solid or laminated iron providing a magnetic bridge from one bar magnet to the other. These solid or laminated iron bridges include an appreciable amount of soft iron material necessary to be magnetized, which reduce the magnetic intensity of the latter, while the joints between such magnets and the bridges result in a structure much less efficient than solid material and obstruct the magnetic flux stream, so that built-up or composite bar magnets are much weaker and therefore less effective than one-piece U-shaped permanent magnets of the same weight.

The principal object of my invention is to provide a magneto rotor embodying two U-shaped permanent magnets arranged longitudinally of the drive shaft and supported by two non-magnetic plates keyed or otherwise secured to the shaft, thus resulting in a very rigid structure for supporting powerful magnets. As such U-shaped magnets are integral, and not made up of several parts as is common with bar magnets, they withstand the excessive vibrations present in tractors, or the hammer blows of impulse couplings, which frequently loosen and weaken a composite bar magnet, and which resistance to vibration and positive rigidity of the one-piece magnet is further assured by its stable mounting on a single shaft extending entirely through the rotor. The simplicity of a rotor embodying but a single shaft and round one-piece magnets also results in comparatively inexpensive manufacture, so that I am enabled to produce such a unitary structure of increased mechanical and magnetic strength at minimum of cost.

In the accompanying drawing, forming part hereof, Figure 1 is a longitudinal sectional view of a magneto rotor embodying my invention, as seen when looking in the direction of the arrows 1—1 in Fig. 3; Fig. 2, an elevation showing the formation of the magnets; Fig. 3, an end elevation as seen when looking in the direction of the arrows 3—3 in Fig. 1; Fig. 4, a detail section taken on the dotted line 4—4 in Fig. 3; Figs. 5 and 6, detail sections taken on the dotted lines 5—5 and 6—6 respectively in Fig. 1; Fig. 7, a detail section of a modified form of my improvement taken on the dotted line 7—7 in Fig. 8, and Fig. 8 is an end elevation of said modified form as seen when looking in the direction of the arrows 8—8 in Fig. 7.

In said drawing the numeral 5 indicates a shaft for supporting and driving the rotor, and which shaft is provided with actuating elements as a gear 6 and cam 7, or otherwise, in a well known manner.

In carrying out my invention I employ two U-shaped integrally formed permanent magnets 8, 9, positioned at opposite sides of the shaft 5, and which magnets, at their curved ends 10 are bent outwardly or offset away from the shaft, as indicated in Fig. 2, to provide clearance for assemblage thereof with said shaft. The legs 11 of the magnets are round and at their ends are fitted into a series of preferably sector-shaped soft iron laminations 12, as indicated in Fig. 6, mounted on a non-magnetic plate 13, and which laminations and plate are securely held in engagement by snap-rings 14 which fit into grooves 16 in the magnet leg, the plate 13 being secured to shaft 5 by a suitable key, as 15, and which is further fixedly held on the shaft by one or more snap-rings 17, 18, fitting into grooves 19, 19', Fig. 4, on said shaft, in which manner the legs, laminations, shaft and plate are held in rigid assembled position, and which laminations form a magnetic bridge from one leg of one permanent magnet to the leg of the other permanent magnet having the same polarity. The magnets 8 and 9 are maintained in fixed spaced relation to the shaft 5 by means of a non-magnetic plate 20 secured to the shaft by snap-rings 21, 22, fitting into the grooves 23, 24, of the shaft, and which plate is further engaged with said shaft by a key 25 of any desired form, and other parts of the equipment, as the gear 6, may be removably secured to the shaft by a key as 27 and snap-rings 28, 29, as indicated in Fig. 1. It will thus be seen that the magnets, shaft and laminations as a unit are fixedly assembled in a simple manner by binding plates and fasteners so that the parts may be readily disassembled, or removed, as desired, for replacement or otherwise, and that, as I employ a single shaft, a rigid structure is provided for supporting powerful magnets. While I have shown and described snap-rings for fixedly securing the various elements I desire it to be understood that any suitable fastening means may be employed, for example, that shown in Figs. 7 and 8, comprising rivets 30 passing through the non-magnetic binding plates 31 and 13, or other equivalent devices for securing the rotor elements in fixed assembled relation may be employed. It will also be understood that the magnets, laminations and binding plates may be assembled and handled as a unit in the course of manufacture and shipping and by inserting and securing the shaft the rotor cage will be completed and ready for installation, and that by employing the keys 15, 25, secure fastening means are provided and by which the magnet assembly will be driven by the shaft.

I claim as my invention:

1. A magneto rotor comprising a single shaft, permanent magnets each comprising a single U-shaped member positioned at opposite sides of the shaft and having their curved ends offset away from the shaft, a binding plate on the shaft engaging the opposite ends of the magnets, laminated material on the magnets, means for securing the plate to the shaft, and means for securing the laminations to the plate.

2. A magneto rotor comprising a shaft, permanent magnets each comprising a single U-shaped member positioned in longitudinal relation to the shaft and having their curved ends offset away from the shaft, laminated material on the magnets, means for binding the shaft, magnets and laminations together, and means for securing said binding means in relation to said elements.

3. A magneto rotor comprising a single shaft, U-shaped permanent magnets each composed of a single piece of material positioned in longitudinal relation to the shaft and having their curved ends offset away from the shaft, a non-magnetic plate for securing the ends of the magnets and the shaft together, and a non-magnetic plate securing said shaft and the offset curved ends of the magnets together.

4. A magneto rotor comprising a shaft, U-shaped permanent magnets each composed of a single piece of material positioned in longitudinal relation to the shaft and having their curved ends offset away from the shaft, laminated material mounted on the magnet legs, means for binding the shaft, legs and laminations together, and other means for binding the offset ends of the magnet legs and shaft together.

5. A magneto rotor comprising a single shaft, a plurality of U-shaped permanent magnets each composed of a single piece of material positioned in longitudinal relation to the shaft and having their curved ends offset away from the shaft, laminated material mounted on the magnet legs, a binding plate engaging the magnet legs, and snap-rings for securing said plate, legs and laminations together.

6. A magneto rotor comprising a shaft, a plurality of U-shaped magnets each composed of a single piece of material positioned in longitudinal relation to the shaft and having their curved ends offset away from the shaft, laminated material mounted on the magnet legs, a binding plate engaging said legs, means for securing the plate to the shaft, means for securing the plate to the offset ends of the magnets, means for securing the laminations to the plate, and means remote from the laminations for securing the legs and shaft together.

7. A magneto rotor comprising a shaft, a plurality of permanent magnets each composed of a single piece of material and each having legs and a curved portion offset away from and positioned in longitudinal relation to the shaft, and means for securing the magnets to the shaft.

8. A magneto rotor comprising a shaft, a plurality of permanent magnets each composed of a single piece of material and each having legs and a curved portion offset away from and positioned in longitudinal relation to the shaft, laminations on the magnet legs, a plate secured to the shaft for supporting the laminations, and means for connecting the legs to the plate.

9. In a magneto rotor, a shaft, a U-shaped one-piece magnet having a curved portion offset away from the shaft and legs extending therefrom, and a non-magnetic element secured to the shaft and to the magnet legs for maintaining the latter in longitudinal relation to the shaft.

10. In a magneto rotor, a shaft, a U-shaped one-piece magnet having a curved portion offset away from the shaft and legs extending therefrom, laminated material of substantially sector-shape mounted on the legs, a non-magnetic element secured to the shaft and to the magnet legs, and means for binding said laminations to the plate.

11. A magneto rotor comprising a single shaft, a plurality of U-shaped permanent magnets each composed of a single piece of material positioned in longitudinal relation to the shaft, laminated material mounted on the magnet legs, a binding plate, a key securing the plate to the shaft, yielding means securing the plate to the legs, yielding means securing the laminations to the plate, a non-magnetic plate securing the legs and shaft together, and a key engaging the shaft and latter plate whereby with the first mentioned key the magnets are rotatably actuated by the shaft.

12. A magneto rotor comprising a single shaft, a binding plate keyed to the shaft and having openings therein, a plurality of U-shaped magnets each composed of a single piece of material positioned in longitudinal relation to the shaft and the ends thereof extending through said plate, laminated material mounted on the magnet legs, means for securing the laminations to the plate, means for securing the exposed ends of the magnet legs to the plate, a non-magnetic plate remote from the laminations for securing the shaft and legs together, and means for securing the latter plate to the shaft whereby with the keyed binding plate the magnets are rotatably actuated by the shaft.

13. A magneto rotor comprising a single shaft, a binding plate secured to the shaft, a plurality of U-shaped magnets each composed of a single piece of material positioned at opposite sides of and in longitudinal relation to the shaft and the ends thereof engaging said plate, laminated material mounted on the magnet legs, means for securing the laminations to the plate, a non-magnetic plate remote from the laminations for securing the shaft and legs together, and means for securing the latter plate to the shaft whereby with the binding plate the magnets are rotatably actuated by the shaft.

14. A magneto rotor comprising a shaft, a binding plate secured to the shaft, a plurality of U-shaped magnets positioned at opposite sides of and in longitudinal relation to the shaft and having their curved ends offset away from the shaft and their free ends engaging the plate, laminated material mounted on the magnet legs, means for securing the laminations to the plate, a non-magnetic plate remote from the laminations for securing the shaft and offset ends of the magnets together, and means for securing the latter plate to the shaft whereby with the binding plate the magnets are rotatably actuated by the shaft.

15. A magneto rotor comprising oppositely disposed U-shaped permanent magnets each composed of a single piece of material, a binding plate engaging the free ends of the magnet legs, laminations mounted on the magnet legs, means for securing the legs, laminations and binding plate together, a non-magnetic plate adjacent the laminations and through which the magnet legs pass and are held in fixed spaced relation, said magnets, laminations and plates comprising a unitary structure, a shaft insertible between the magnets and passing through the non-magnetic plate and the binding plate, means for drivingly securing the non-magnetic plate and shaft together, and means for drivingly securing the binding plate and shaft together, said driving means and shaft rotating said unitary structure.

HENRY G. COX.